United States Patent Office 2,937,180
Patented May 17, 1960

2,937,180

(4-HYDROXY-4-PHENYLPIPERIDINE)ALKANOIC ACID AMIDES

Paul Adriaan Jan Janssen, Vosselaar, near Turnhout, Belgium

No Drawing. Application December 22, 1958
Serial No. 781,841

8 Claims. (Cl. 260—294)

The present invention relates to derivatives of (4-hydroxy-4-phenylpiperidine)alkanoic acid amides. More particularly this invention is concerned with the compounds of the general structural formula

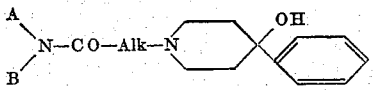

and the non-toxic salts thereof, wherein A is a hydrogen or lower alkyl radical, B is a cyclopentyl, cyclohexyl, phenyl, fluorophenyl, chlorophenyl, bromophenyl, iodophenyl, nitrophenyl or tolyl radical and Alk is a lower alkylene radical.

Among the radicals which A can represent are such lower alkyl groups as methyl, ethyl, propyl, butyl, pentyl, and hexyl, wherein the propyl, butyl, pentyl and hexyl groups may be either of the straight-chain or branch-chain type.

The radical Alk represents a lower alkylene radical such as methylene, ethylene, propylene, trimethylene, tetramethylene, pentamethylene and hexamethylene.

The (4-hydroxy-4-phenylpiperidine)alkanoic acid amides depicted above form pharmaceutically acceptable salts with a variety of inorganic and strong organic acids including sulfuric, phosphoric, hydrochloric, hydrobromic, succinic, malic, citric, maleic, ascorbic, sulfamic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The compounds of this invention can be prepared by condensing an appropriately selected haloalkanoic acid amide of the formula

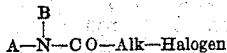

with 4-phenyl-4-piperidinol, where A, B and Alk are defined as hereinabove. The reaction can be carried out in an inert solvent such as an aromatic hydrocarbon (e.g. toluene, benzene), lower alkanol (e.g. ethanol, butanol), dioxane and a lower alkanone, (e.g. butanone, pentanone), at elevated temperatures.

The haloalkanoic acid amides used as starting materials can be prepared by the condensation of an amide of the formula

ABNH with a compound of the formula Halogen-CO-Alk-Halogen.

The compounds of this invention have useful pharmacological properties. They are potent depressants of the central nervous system and exhibit marked tranquilizing effects in low dosage. They potentiate barbiturate hypnosis and produce the loss of the righting reflex in experimental animals.

The examples given below illustrate in detail some of the compounds which comprise this invention and methods for their production. It will be apparent to those skilled in the art that numerous modifications in materials and methods can be adopted without departing from the invention. In these examples quantities of materials are given in parts by weight, pressures in millimeters (mm.) of mercury, and temperatures in degrees centigrade (° C.).

Example 1

In a bomb a mixture of 9.5 parts of N-cyclohexyl-β-chloropropionamide, 17.7 parts of 4-hydrovy-4-phenyl-piperidine, and 0.1 part of potassium iodide in 120 parts of toluene is heated for 50 hours at a temperature of 140–150° C. The mixture is filtered and the remaining solid is heated with water. The product is collected on a filter and recrystallized from a mixture of 400 parts of benzene and 40 parts of isopropanol. In this manner there is obtained N-cyclohexyl-β-(4-hydroxy-4-phenyl-piperidine) propionamide melting at 182.6–183.8° C. The structural formula is

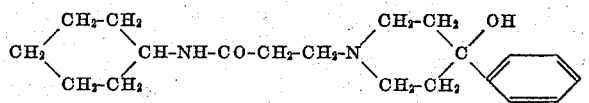

Substitution of 9 parts of N-cyclopentyl-β-chloropropionamide as a starting material in this process yields N-cyclopentyl-β-(4-hydroxy-4-phenylpiperidine)-propionamide.

Example 2

In a sealed reactor a mixture of 10.2 parts of N-cyclohexyl-γ-chlorobutyramide, 17.7 parts of 4-hydroxy-4-phenylpiperidine, and 0.1 part of potassium iodide in 120 parts of toluene is heated for 72 hours at a temperature of 140–150° C. The precipitate is collected on a filter, washed twice with 500 parts of water, and boiled in 600 parts of diisopropyl ether. The solution is cooled, and the product is collected on a filter. The N-cyclohexyl-γ-(4-hydroxy-4-phenylpiperidine) butyramide melts at 138.8–140.6° C.

Example 3

A mixture of 8.4 parts of α-chloroacetanilide, 17.7 parts of 4-hydroxy-4-phenylpiperidine, and 200 parts of isopropanol is refluxed for 7 hours. The mixture is cooled, and the solvent is evaporated. The residue is taken up in water and ether. The etheric layer is separated, whereupon there precipitates the product which is then collected on a filter. The α-(4-hydroxy-4-phenylpiperidine)acetanilide thus obtained melts at 115–115.8° C.

Example 4

In a sealed reactor a mixture of 10.5 parts of β-chloropropionanilide, 17.7 parts of 4-hydroxy-4-phenylpiperidine, and 0.1 part of potassium iodide in 160 parts of toluene is heated for 72 hours at a temperature of 140–150° C. The contents of reactor are cooled and treated with water and ether. The ether layer is separated, dried over anhydrous potassium carbonate, and filtered. Dry, gaseous hydrogen chloride is introduced into the solution, whereupon there precipitates the hydrochloride. The product is washed with boiling acetone to yield as a residue β-(4-hydroxy-4-phenylpiperidine)propionanilide hydrochloride melting at 239° C.

Example 5

In a sealed reactor a mixture of 10.1 parts of β-chloro-p-fluoropropionanilide, 17.7 parts of 4-hydroxy-4-phenylpiperidine, and 0.1 part of potassium iodide in 130 parts of toluene is heated for 40 hours at a temperature of 140–150° C. After decantation of the solvent, the residue is extracted with 400 parts of water and 320 parts of ether. The remaining solid is collected on a filter, washed with water, and dried to yield β-(4-hydroxy-4-phenylpiperidine)-p-fluoropropionanilide melting at 133.8–135.2° C.

Example 6

In a bomb a mixture of 13 parts of β,o-dichloropropionanilide, 17.7 parts of 4-hydroxy-4-phenylpiperidine, and 0.1 part of potassium iodide in 160 parts of toluene is heated for 72 hours at a temperature of 140–150° C. After cooling the reaction mixture to about 40° C., the residue is filtered off. The filtrate is further cooled to 0° C., and the product is collected on a filter. The β-(4-hydroxy-4-phenylpiperidine)-o-chloropropionanilide melts at 138–138.8° C.

Example 7

A mixture of 11.5 parts of β,m-dichloropropionanilide, 17.7 parts of 4-hydroxy-4-phenylpiperidine, and 0.1 part of potassium iodide in 160 parts of toluene is heated in a sealed tube for 78 hours at a temperature of 140–150° C. The contents of the tube are cooled to room temperature and filtered. The filtrate is then cooled to about 0° C., whereupon there precipitates the first crop of product which is collected on a filter and found to melt at 131.4–132.4° C. A second crop is obtained by dissolving the solid fraction in 400 parts of boiling diisopropylether, filtering, and cooling to yield a precipitate of β-(4-hydroxy-4-phenylpiperidine)-m-chloropropionanilide.

Example 8

Substitution of an equal amount of β,p-dichloropropionanilide for the β-chloropropionanilide used in Example 4 yields β-(4-hydroxy-4-phenylpiperidine)-p-chloropropionanilide hydrochloride which is recrystallized from a mixture of 160 parts of acetone and 160 parts of isopropanol. The compound melts at 231.5–234.7° C. with decomposition.

Substitution of 12.5 parts of β-chloro-p-iodopropionanilide as starting material in this process yields β-(4-hydroxy-4-phenylpiperidine)-p-iodopropionanilide hydrochloride.

Example 9

Substitution of 10 parts of β-chloro-o-propionotoluide for β,o-dichloropropionanilide in Example 6 yields β-(4-hydroxy-4-phenylpiperidine)-o-propionotoluide melting at 122–123° C.

Example 10

In a bomb mixture of 9.9 parts of β-chloro-m-propionotoluide, 17.7 parts of 4-hydroxy-4-phenylpiperidine, and 0.1 part of potassium iodide in 110 parts of toluene is heated for 90 hours at a temperature of 140–150° C. The contents of the bomb are cooled, and the precipitate is collected on a filter and washed with water. The crude product is purified by recrystallization from a mixture of 250 parts of diisopropyl ether and 8 parts of isopropanol to yield β-(4-hydroxy-4-phenylpiperidine)-m-propionotoluide melting at 97–101° C.

Example 11

A mixture of 10 parts of β-chloro-p-propionotoluide, 17.7 parts of 4-hydroxy-4-phenylpiperidine, and 0.1 part of potassium iodide in 160 parts of toluene is heated in a bomb for 72 hours at a temperature of 140–150° C. The contents of the bomb are cooled and treated with water and ether. The ether layer is separated, dried over anhydrous potassium carbonate, and filtered. Dry, gaseous hydrogen chloride is introduced into the solution. The hydrochloride precipitate is collected on a filter and boiled in acetone. The mixture is then cooled, and the product is collected on a filter and recrystallized at −15° C. from a mixture of 160 parts of isopropanol and 160 parts of acetone. The β-(4-hydroxy-4-phenylpiperidine)-p-propionotoluide hydrochloride thus obtained melts at 216–217.9° C.

Example 12

A mixture of 11.5 parts of β-chloro-o-nitropropionanilide, 17.7 parts of 4-hydroxy-4-phenylpiperidine, and 0.1 part of potassium iodide in 140 parts of toluene is heated in a sealed reactor for 50 hours at a temperature of 140–150° C. After filtration, ether is added to the solution, and anhydrous hydrogen chloride gas is introduced. The resulting product is collected on a filter and recrystallized from 600 parts of isopropanol to yield β-(4-hydroxy-4-phenylpiperidine)-o-nitropropionanilide hydrochyoride melting at 180–182° C.

Example 13

In a bomb a mixture of 13 parts of γ,o-dichlorobutyranilide, 17.7 parts of 4-hydroxy-4-phenylpiperidine, and 0.1 part of potassium iodide in 160 parts of toluene is heated for 72 hours at a temperature of 140–150° C. The contents of the bomb are cooled and filtered. The filtrate is treated with water and ether. The ether layer is then separated, dried over anhydrous potassium carbonate, and filtered. Anhydrous hydrogen chloride gas is passed through the solution, whereupon the hydrogen chloride precipitates. The precipitate is recrystallized from a mixture of 40 parts of isopropanol and 80 parts of methanol to yield γ-(4-hydroxy-4-phenylpiperidine)-o-chlorobutyranilide hydrochloride melting at 173.2–175.3° C.

Example 14

In a sealed reactor a mixture of 10.5 parts of γ-chloro-o-butyrotoluide, 17.7 parts of 4-hydroxy-4-phenylpiperidine, and 0.1 part of potassium iodide in 160 parts of toluene is heated for 72 hours at a temperature of 140–150° C. After cooling the reaction mixture to room temperature, the solution is decanted leaving an oily product which crystallizes at about 0° C. The γ-(4-hydroxy-4-phenylpiperidine)-o-butyrotoluide thus obtained melts at 118–119° C.

Example 15

In a bomb a mixture of 10.8 parts of γ-chloro-m-butyrotoluide, 17.7 parts of 4-hydroxy-4-phenylpiperidine, and 0.1 part of potassium iodide in 120 parts of toluene is heated for 72 hours at a temperature of 140–150° C. The residue is collected on a filter and washed twice with water. To the filtrate are added 400 parts of diisopropylether. The solution is boiled and then filtered. Upon cooling the filtrate, there precipitates the impure product. The insoluble fraction is dissolved, cooled to 0° C., and collected on a filter to yield the third crop of product. The total crop is dissolved in isopropanol and evaporated to yield an oil which solidifies upon scratching in 40 parts of diisopropylether. This product is recrystallized from 120 parts of benzene to yield γ-(4-hydroxy-4-phenylpiperidine)-m-butyrotoluide melting at 124.6–126.4° C.

Example 16

A mixture of 10.6 parts of N-methyl-γ-chlorobutyranilide, 17.7 parts of 4-hydroxy-4-phenylpiperidine, and 0.1 part of potassium iodide in 110 parts of toluene is heated in a sealed reactor for 70 hours at a temperature of 140–150° C. The reaction mixture is treated with water and ether. The ether layer is separated, dried over anhydrous potassium carbonate, and filtered. A precipitate results from passing dry hydrogen chloride gas through the solution. The hydrochloride is collected on a filter and recrystallized from a mixture of 80 parts of isopropanol and 40 parts of methanol to yield N-methyl-γ-(4-hydroxy-4-phenylpiperidine)butyranilide hydrochloride melting at 242–242.8° C.

Substitution of 11.5 parts of N-propyl-γ-chlorobutyranilide in the foregoing reaction yields the hydrochloride of N-propyl-γ-(4-hydroxy-4-phenylpiperidine)butyranilide in fine, colorless prisms.

What is claimed is:

1. A compound of the structural formula

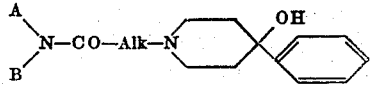

wherein A is a member of the class consisting of hydrogen and lower alkyl radicals, B is a member of the class consisting of cyclopentyl, cyclohexyl, phenyl, halophenyl, nitrophenyl, and tolyl radicals, and Alk is a lower alkylene radical.

2. A compound of the structural formula

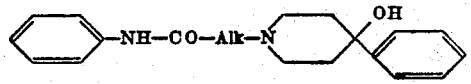

wherein Alk is a lower alkylene group.

3. β-(4-hydroxy-4-phenylpiperidine)propionanilide.

4. A compound of the structural formula

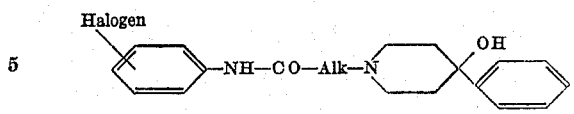

wherein Alk is a lower alkylene radical.

5. β-(4-hydroxy-4-phenylpiperidine)-o-chloropropionanilide.

6. β-(4-hydroxy-4-phenylpiperidine)-m-chloropropionanilide.

7. A compound of the structural formula

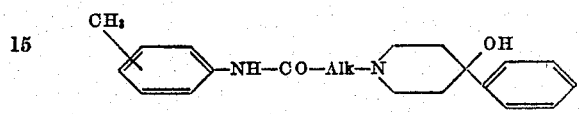

wherein Alk is a lower alkylene radical.

8. γ-(4-hydroxy-4-phenylpiperidine)-m-butyrotoluide.

No references cited.